United States Patent [19]

Baker

[11] Patent Number: 5,062,338
[45] Date of Patent: Nov. 5, 1991

[54] HACKSAW BLADE WITH BI-DIRECTIONAL TEETH

[76] Inventor: Slade H. Baker, 109 ½ Broad St., Mankato, Minn. 56001

[21] Appl. No.: 492,834

[22] Filed: Mar. 13, 1990

[51] Int. Cl.$^5$ ............................................. B27B 21/02
[52] U.S. Cl. ...................................... 83/848; 83/849; 83/835
[58] Field of Search ................... 83/835, 837, 846–855

[56] References Cited

U.S. PATENT DOCUMENTS

| | | | |
|---|---|---|---|
| 391,843 | 9/1888 | Gray | 83/852 |
| 706,447 | 8/1902 | Peart | 83/848 |
| 907,168 | 12/1908 | Neill | 83/835 |
| 1,497,577 | 6/1924 | Morzsa . | |
| 2,365,301 | 12/1944 | Shortell | 83/848 |
| 2,450,942 | 10/1948 | Donnelly . | |
| 2,804,110 | 8/1957 | Collins . | |
| 2,829,684 | 4/1958 | Lagerstrom | 83/852 |
| 3,016,932 | 1/1962 | Jacobson . | |
| 3,929,050 | 12/1975 | Salzwedel . | |
| 4,784,034 | 11/1988 | Stones et al. | 83/852 |

FOREIGN PATENT DOCUMENTS 0017199 of 1889 United Kingdom ................. 83/852

Primary Examiner—Frank T. Yost
Assistant Examiner—Allen M. Schrock
Attorney, Agent, or Firm—Palmatier & Sjoquist

[57] ABSTRACT

The present invention includes a bi-directional hacksaw blade that bites into and saws an object and clears particulate from a cut being formed in the object in each of the forward and rearward sawing directions. Each of the blade embodiments disclosed include a blade with two sets of teeth. The teeth of the first set is a mirror image of the teeth of the second set so that one set saws the object and the other set clears particulate in one sawing direction. In the opposite sawing direction, the roles of the teeth are reversed.

2 Claims, 2 Drawing Sheets

HACKSAW BLADE WITH BI-DIRECTIONAL TEETH

The present invention relates to hacksaw blades and, more particularly, to hacksaw blades that bite into and saw on object in each of the forward and rearward sawing directions and that clear particulate matter from the cut being formed in the object in each of the forward and rearward sawing directions.

BACKGROUND OF THE INVENTION

A hacksaw blade is typically a tough, fine-toothed blade stretched taut in a saw frame and is usually used for cutting metal. Conventional hacksaw blades include teeth that bite into and saw a metal object when the hacksaw is manipulated in one direction. When the hacksaw is manipulated in the opposite direction, the teeth clear the cut debris from the cut being formed in the object.

SUMMARY OF THE INVENTION

A feature of the present invention is the provision in a hacksaw blade having two sets of teeth, of one of the sets being a mirror image of the other set whereby the hacksaw blade bites into and saws an object and clears metal debris from the cut being formed in the object in each of the forward and rearward sawing directions.

Another feature is the provision in such a hacksaw blade, of each of the teeth of the first set being arranged in an alternating fashion with each of the teeth of the second set so that the tooth biting into the object is immediately preceded by a tooth clearing particulate from the cut being formed in the object.

Another feature is the provision in such a hacksaw blade, of staggered teeth wherein the teeth of the cutting set have tips which extend outwardly relative one of the faces of the blade and wherein the teeth of the clearing set have tips which extend outwardly relative to the other face of the blade.

Another feature is the provision in such a hacksaw blade, of the teeth of the cutting set being disposed transversely of the teeth of the clearing set.

An advantage of the present invention is that an object is sawed more quickly than with a conventional hacksaw blade because the bi-directional blade saws and clears particulate from an object in both forward and rearward sawing directions, and because each of the cutting teeth is immediately preceded by a clearing tooth that clears particulate from the cut.

Another advantage is that sawing motion and energy is conserved because the number of strokes for sawing is typically reduced by about one-half.

Another advantage is that the bi-directional blade is readily and inexpensively fabricated. Furthermore, in one embodiment, the bi-directional blade is formed simply by welding two hacksaw blades back-to-back.

DETAIL DESCRIPTION OF THE PREFERRED EMBODIMENTS

Figure 1:
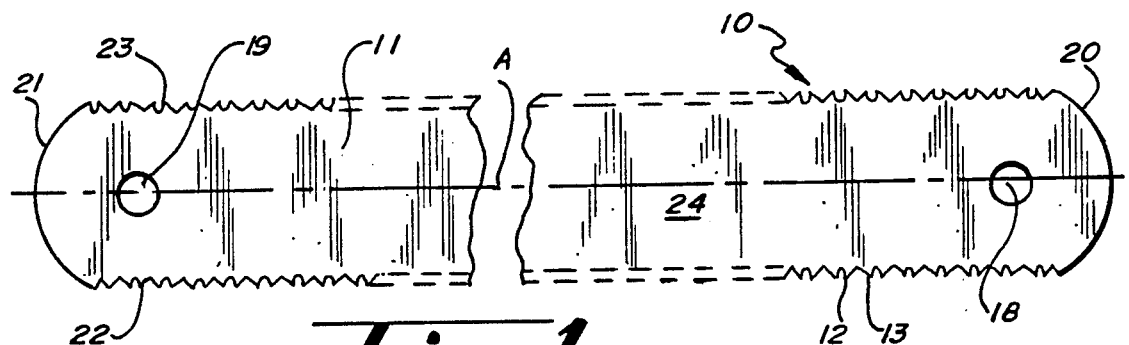
FIG. 1 is a side elevation fragmented view of the preferred embodiment of the bi-directional blade.
Figure 3:
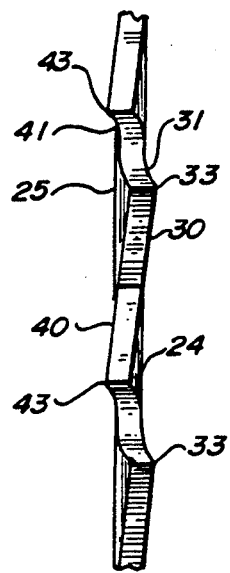
FIG. 3 is a bottom plan view of the blade illustrated in FIG. 2.
Figure 2:
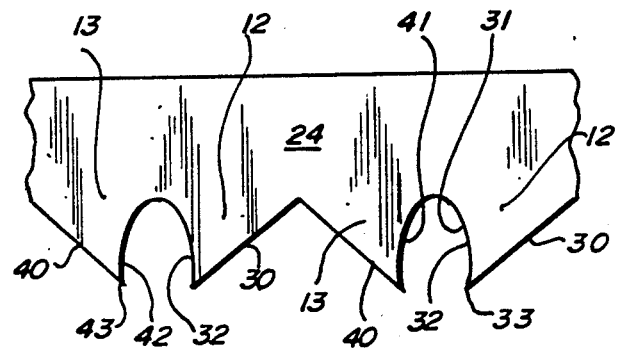
FIG. 2 is a detail elevation view of the blade illustrated in FIG. 1.
Figure 5:
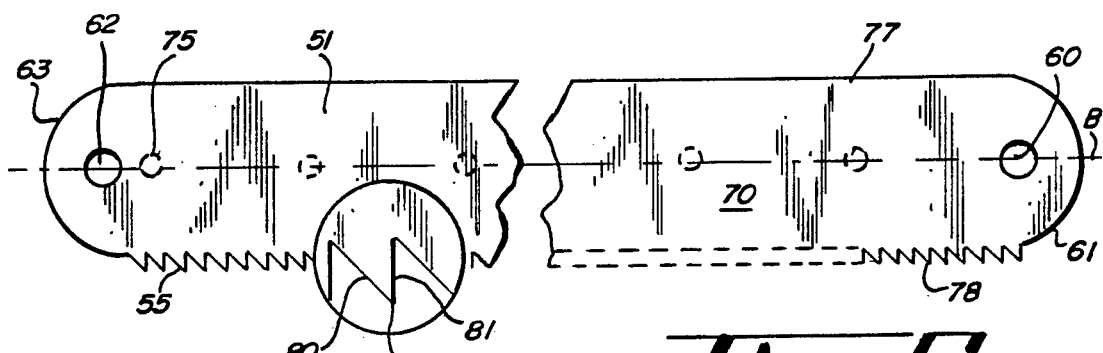
FIG. 5 is a side elevation fragmented view of one of the blade portions of the blade illustrated in FIG. 4.
Figure 6:
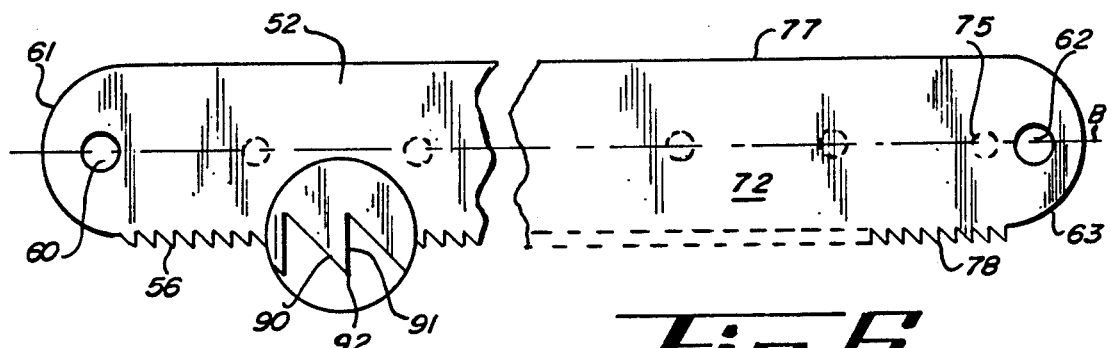
FIG. 6 is a side elevation fragmented view of the other blade portion of the blade illustrated in FIG. 4.
Figure 4:
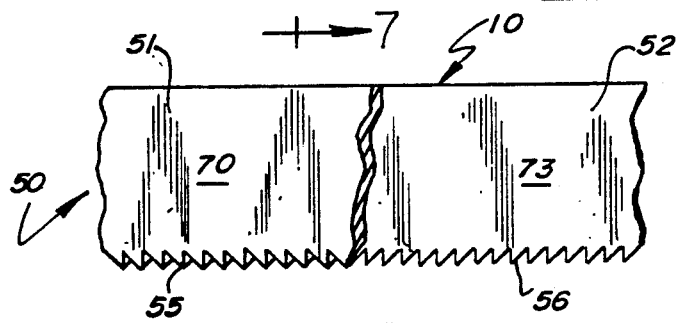
FIG. 4 is a broken away view of a segment of an alternate bi-directional blade.
Figure 7:
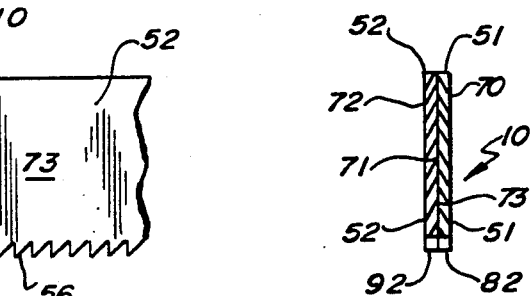
FIG. 7 is a section view at 7—7 of FIG. 4.

As shown in FIGS. 1-3, a bi-directional hacksaw blade is indicated in general by the reference numeral 10 and includes a blade strip or body 11, a first set of teeth 12, and a second set of teeth 13 shaped in the mirror image of and arranged in alternating and staggered relation to the teeth 12.

The blade strip 11 is a relatively thin, flat piece or strip of metal or hardened steel with a pair of apertures 18, 19 for connection to a hacksaw. Aperture 18 defines a front end 20 and aperture 19 defines a rear end 21.

The blade strip 11 further includes two toothed edges 22, 23. Each of the toothed edges 22, 23 includes first and second sets of teeth 12, 13. Apertures 18, 19 define an axis A spaced equidistant from the edges 22, 23. Blade strip 11 also includes opposing faces 24, 25.

Each tooth 12 includes a linear clearing edge 30 disposed at an acute angle of about 45° relative to axis A and the rear end 21 of the blade 10. The clearing edge 30 clears particulate or debris from a cut formed in an object by the blade 10. It should be noted that the clearing edge 30 may be disposed at an acute angle of between about 30° and 60° relative to axis A and the rear end 21.

Each tooth 12 further includes a second edge 31 that is elliptic. The second elliptic edge 31 includes a substantially linear edge portion 32 that bites into and saws a metal object. The substantially linear edge cutting portion 32 and the linear clearing edge 30 form a first tip 33 which also participates in the biting into and sawing of an object.

Each tooth 13 is a mirror image of each tooth 12. Accordingly, each tooth 13 includes a linear clearing edge 40 disposed at an acute angle of about 45° relative the axis A and front end 20 of the blade 10. The clearing edge 40 clears particulate or debris from a cut being formed in an object by the blade 10. Clearing edge 40 may be disposed at an acute angle of between about 30°-60° relative axis A and the front end 20 of the blade 10.

Each tooth 13 further includes a second edge 41 that is elliptic. The second elliptic edge 41 includes a substantially linear edge cutting portion 42 that bites into and saws an object. The substantially linear edge cutting portion 42 and the linear clearing edge 40 form a second tip 43 which also participates in the biting into and sawing of an object.

The teeth 12, 13 are arranged in an alternating fashion with each other and with the elliptic edges 31, 41 leading into each other and forming the shape of half an ellipse. Linear clearing edges 30, 40 also lead into each other and form the shape of a V. The alternate relationship of the teeth 12, 13 provides an immediate clearing of debris from the cut for the respective trailing cutting teeth which thus may bite more cleanly into an object being sawed.

The tips 33 and a portion of each tooth 12 extend outwardly from the face 24. The tips 43 and a portion of each tooth 13 extend outwardly from the other face 24 so as to be staggered relative the teeth 12. As shown in FIG. 3, the linear clearing edges 30, 40 are disposed in substantially the same plane, which lies obliquely relative to the blade strip 11 so that each of the clearing edges 30, 40 is staggered relative to their respective cutting edges 42, 32.

In operation, the blade 10 is affixed to a hacksaw via apertures 18, 19 with, for example, edge 22 oriented to saw an object. The edge 22 is then disposed against the surface of the object and the blade 10 is drawn in one direction as, for example, from the front end 20 to the rear end 21 which in hand tools is typically a pulling motion. As the blade 10 brings pressure to bear on the surface of the object in such a direction, the tips 43 and the linear cutting edge portions 42 of teeth 13 bite into and saw the object. Simultaneously, the immediately preceding clearing edges 30 of the teeth 12 clear particulate matter from the cut formed in the object by the teeth 12. The particulate matter is typically cleared to face 24 of the blade 10.

The sawing direction is subsequently reversed so as to draw the blade 10 from the rear end 21 to the front end 20 which in hand tools is typically a pushing motion. In such a direction, the tips 33 and linear cutting edge portions 32 bite into and saw the object. Simultaneously, the immediately preceding edges 40 of the teeth 13 push particulate matter toward the face 25 of the blade 10.

As the blade 10 saws the object, the cut which is formed is typically of a width slightly greater than the thickness of the blade strip 11. The transversely extending tips 33, 43 may contribute to such a cut width. The width of the cut may allow particulate matter to be pushed into spaces between faces 24, 25 and the metal object.

As shown in FIGS. 4-8, an alternate bi-directional hacksaw blade 50 includes a first blade portion 51 and a second blade portion 52. Blade portion 51 includes a first set of teeth 55 and blade portion 52 includes a second set of teeth 56. Each of the blade portions 51, 52 include a front aperture 60 defining a front end 61 and a rear aperture 62 defining a rear end 63.

Blade portion 51 includes faces 70, 71. Blade portion 52 includes faces 72, 73. The blade portions 51, 52 are rigidly affixed together such as by welding with spot weld 75 so that faces 71, 73 are adjacent and so that the first and second sets of teeth 55, 56 are oriented in opposite directions.

Each of the blade portions 51, 52 include a flat edge 77 and a toothed edge 78. Each of the blade portions 51, 52 include an axis B spaced equidistant from the edges 77, 78.

Each tooth 55 includes a linear clearing edge 80 disposed at an acute angle of typically 45° relative to axis B and the front end 61 of the blade portion 51. Edge 80 may be disposed at such an acute angle between about 30°-60°. Each tooth 55 further includes a second cutting edge 81 disposed substantially normal relative to the axis B for biting into and cutting an object. The edges 80, 81 form a tip 82, which also participates in the cutting of an object.

Figure 8:
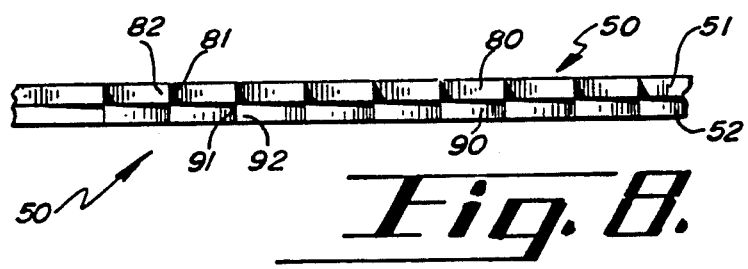
FIG. 8 is a bottom plan view of a segment of the blade illustrated in FIG. 4.

Each tooth 56 is a mirror image of each tooth 55. Each of the teeth of the first set 56 includes a linear clearing edge 90 disposed at an acute angle of typically 45° relative to axis B and the rear end 63 of the blade portion 52. Edge 90 may be disposed at such an acute angle of between about 30°-60°. Each tooth 56 further includes a second cutting edge 91 disposed substantially normal relative to axis B for biting into and cutting an object. The edges 90, 91 form a tip 92 which also participates in the biting into and the cutting of an object. The second edges 81, 91 which run normal to axis B are disposed so as to be aligned and transverse of each other, as shown in FIG. 8.

In the operation of the alternate blade embodiment 50, the cutting edges 81 and tip 82 of teeth 55 bite into the objects being sawed and the clearing edges 90 clear particulate matter from the cut being formed when the blade 50 is drawn from the front end 61 to the rear end 63. When the blade is drawn so that the rear end 63 leads, the cutting edges 91 and tips 92 bite into the object being sawed and clearing edges 80 clear particulate matter from the cut being formed.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A hacksaw blade for being mounted on a hacksaw for sawing an object, the blade producing a cut and particulate matter when sawing the object, the blade comprising a blade with two ends, first and second edges, and opposing faces, the blade further having an axis disposed equidistant from the first and second edges and extending between the ends, the blade further having a pair of apertures for connecting the blade to the hacksaw, each of the apertures adjacent one of the ends a first set of teeth being disposed on the first and second edges of the blade to saw the object in one sawing direction from one of the ends to the other end of the blade, each of the teeth of the first set having a linear clearing edge disposed at an acute angle relative the axis, each of the teeth of the first set further having an elliptic cutting edge, each of the liner clearing edges and each of the respective elliptic edges forming a tip, and a second set of teeth being disposed on the first and second edges to saw the object in an opposite sawing direction, each of the teeth of the second set being a mirror image of each of the teeth of the first set on their respective edges and having corresponding linear clearing edges, elliptic cutting edges, and tips, each of the teeth of the first set being arranged in an alternating fashion with each of the teeth of the second set, each of the linear clearing edges of the first set of teeth being adjacent to and leading into one of the linear clearing edges of the second set and forming the shape of a V, the elliptic cutting edges of the first set leading into the elliptic cutting edges of the second set and forming essentially the shape of half of an ellipse, the tips of the first set extending outwardly relative to one of the faces of one of the blade and the tips of the second set extending outwardly relative to the other face of the blade so that the tips are staggered relative to each other, each of the adjacent linear edges which form the shape of a V being linear relative to each other to be disposed substantially in the same plane and lying obliquely relative to the blade whereby each of the first and second blade edges saws the object and clears particulate in both of the sawing directions.

2. A hacksaw blade for being mounted on a hacksaw for sawing an object, the blade having teeth that bite into an saw the object when the hacksaw is manipulated in both of the forward and rearward sawing directions, the blade producing a cut and particulate matter when sawing the object, the blade comprising a pair of first and second blades, each of the blades having front and rear ends, first and second edges, and opposing faces, each of the blades further having an axis disposed equidistant from the first and second edges and extending between the front and rear ends, the blades being rigidly affixed to each other so that the first and second edges are aligned, so that one of the faces of one of the blades confronts and bears upon one of the faces of the other blade, and so that the front end of one of the blades is disposed adjacent the rear end of the other blade, each of the blades having a pair of apertures for connecting the blade to the hacksaw, each of the apertures adjacent to one of the ends, each of the apertures being aligned with one of the apertures of the other blade when the blades are rigidly affixed to each other, and a set of teeth being disposed on the first edges of each of the blades, each of the teeth having a linear clearing edge disposed at an acute angle relative to the axis, each of the teeth further having a cutting edge disposed substantially normal relative to the axis, each of the linear clearing edges of one of the blade crossing one of the linear clearing edges of the other blade so as to form an X, each of the linear clearing edges forming a tip, each of the tips of one of the blades being aligned with one of the tips of the other blade whereby one of the blades bites into and saws the object in the forward sawing direction and clears particulate from the cut in the rearward sawing direction and the other blade bites into and saws the object in the rearward sawing direction and clears particulate from the cut in the forward sawing direction.

* * * * *